United States Patent [19]
Larsson

[11] Patent Number: 4,573,426
[45] Date of Patent: Mar. 4, 1986

[54] FLOATING BOOM

[75] Inventor: Erik J. Larsson, Gamleby, Sweden

[73] Assignee: Safe Bridge AB, Vastervik, Sweden

[21] Appl. No.: 576,281

[22] PCT Filed: Apr. 18, 1983

[86] PCT No.: PCT/SE83/00145
§ 371 Date: Dec. 15, 1983
§ 102(e) Date: Dec. 15, 1983

[87] PCT Pub. No.: WO83/03628
PCT Pub. Date: Oct. 27, 1983

[30] Foreign Application Priority Data
Apr. 19, 1982 [SE] Sweden ................................ 8202444

[51] Int. Cl.⁴ ............................................. E02B 15/02
[52] U.S. Cl. ....................................... 114/267; 405/68
[58] Field of Search .............. 114/267, 312, 322, 328, 114/331, 334, 336; 441/30; 405/60, 63, 64, 66, 68

[56] References Cited
U.S. PATENT DOCUMENTS

| | | | |
|---|---|---|---|
| 3,321,923 | 5/1967 | Smith | 114/267 |
| 3,613,377 | 10/1971 | Zaugg | 405/68 |
| 3,703,811 | 11/1972 | Smith | 405/68 |
| 3,859,796 | 1/1975 | Benson | 405/64 |
| 4,015,431 | 4/1977 | Ahiko | 114/267 |
| 4,140,424 | 2/1979 | Bretherick | 405/68 |

Primary Examiner—Trygve M. Blix
Assistant Examiner—C. T. Bartz
Attorney, Agent, or Firm—Sughrue, Mion, Zinn, Macpeak, and Seas

[57] ABSTRACT

An inflatable boom raising hose is sized such that the hose, upon inflation, raises the boom from the sea bed. The hose carries internally a chain which acts as a weight to drive the hose and boom to the sea bed, which takes up tensile forces and which prevents folds being formed in the boom raising hose as it sinks to the sea bed and which insures air passage therethrough, full evacuation of the air therefrom and complete collapse of the boom raising hose during evacuation of air therefrom at one or both ends thereof when the hose is deflated.

6 Claims, 2 Drawing Figures

FLOATING BOOM

BACKGROUND ART

Conventional oil booms normally comprise an elongate buoyant body having an upstanding shield, and possibly also a depending, oil-confining skirt. These booms are normally stored on land in a collapsed state. The task of laying out the boom, in order to contain an oil slick, is both tedious and difficult, especially in bad weather. Alternatively, the boom can be stored afloat on the water, in a ready-to-use state, although in this case the booms are liable to present an obstacle to the normal water traffic, and also spoil the surrounding scenery. Such booms are not suited for the permanent protection of, for example, inlets which are sensitive from an environmental aspect and which lie adjacent a channel for oil tankers. Furthermore, if it is found desirable to place temporary booms around an oil tanker when unloading or loading said tanker, the booms must be laid out and taken in respectively each time it is decided to use the boom. Another disadvantage with protective booms of this kind is that when the wind blows hard, the booms are tilted by the wind, causing the efficiency of the boom to be reduced.

OBJECT OF THE INVENTION

The main object of the present invention is to provide a boom which is always ready-to-hand, laid out, for example, at selected locations, and which in a passive state does not present an obstacle to normal water traffic, but which in the event, for example, of an oil slick can be quickly activated, thereby to provide very good protection against the spreading of oil.

DISCUSSION OF THE BASIC SOLUTION TO THE PROBLEM

This object is achieved by means of a boom which is arranged, in a passive state, to rest on the sea bed and when required for use can be brought to take an active position, by causing the boom to float to the surface. To this end the boom includes a barrier member in the form of an elongate inflatable hose and which boom is arranged to be brought from a passive state, in which it may rest on the sea bed, to an active blocking state by being caused to float to the surface under the action of an inflatable boom-raising hose.

A boom of this kind has many advantages. Since in its passive state, the boom rests on the sea bed, it will not present an obstacle to normal water traffic, and can be laid out without needing to take its aesthetic appearance into account. For example, the boom can be laid out so that it protects particularly sensitive locations or locations along a fairway where oil tankers pass. This kind of boom can also be laid out in a manner to divide, for example, a channel or fiord into sections, which can be closed off, one from the other in the event of an oil slick. The booms can also be laid out around oil tanker loading and unloading locations, and for example, around oil rigs at sea. As soon as an accident occurs, or oil released, the booms can be floated to the surface of the water in just some few minutes, even from great depths, thereby to form an effective protection. Activation of the booms can be effected totally independent of prevailing weather and sea conditions.

Another advantage obtained when storing the booms on the sea bed, is that they are protected against the effects of the sun and the air, therefore extending their useful life. Furthermore, such booms can also be used in winter when ice has formed on the surface of the water, since the booms when activated will float-up and bear tightly against the undersurface of the ice. Subsequent to being activated, a boom according to the invention can be caused to sink back to the sea bed, to adopt its passive position. The boom is also not limited to use solely in the location where it lies in readiness, since subsequent to being activated and having floated to the surface, it can be readily towed by a boat to the place where it is required. Consequently, a large number of booms can be connected together to form a long boom-length, and placed in readiness along a selected coastal area. These booms can then be activated, in a very short space of time, and transported to the area where they are urgently required.

The use of an inflatable hose as a barrier member provides a number of advantages. Firstly, there is obtained in this way an extremely light construction which, if the hose is only inflated to relatively low pressure, is also flexible; the structure is also extremely conformable and provides extremely good protection even in the case of high seas. As a result of using a circular-cylindrical hose, the protective effect afforded will not be affected by the wind, since the effective height above the surface of the water remains the same, even should the hose be twisted.

One problem encountered when using booms in the form of air hoses which are to be floated from the sea bed, is that the air hoses must be capable of withstanding very high pressures, to enable the boom to be lowered to great depths. The combined requirements of ability to withstand high pressures, to enable the hose to be lowered to great depths, and large diameters, to provide the best protective effect in an activated state, is difficult, if not, impossible, to achieve in an economically viable manner. The cost of a high-pressure hose namely increases very steeply with increasing hose diameters.

The U.S. patent specification No. 3 779 020 and the British patent specification No. 953 743 disclose immersible booms. However, the above problem has not been taken into consideration and accordingly these prior art booms cannot be used in deep water.

The reason why the hose must withstand such high pressures is because not all of the boom will reach the surface at the same time. Thus, it is not possible to reduce the pressure in the hose in dependence upon the surrounding water pressure, but that part of the hose which first reaches the surface must be capable of withstanding the whole of the pressure required to expand that part of the hose located deepest in the water.

BRIEF SUMMARY OF THE INVENTION

In accordance with the present invention, this problem is solved by using a boom of the above described type which is characterized in that the boom includes at least two gas-tight hoses which extend in parallel and are mechanically connected to each other, that one of these hoses forms said barrier hose while the other forms said boom-raising hose, that said raising hose is a high-pressure hose having a relatively small diameter which is selected such that the hose upon inflation gives a raising force sufficient to raise the boom from the sea bed and to keep it floating, that the barrier hose is a flexible low-pressure hose arranged to be inflated not until the boom reaches the surface which hose has a diameter considerably greater than the diameter of the raising hose in order to give the desired blocking effect upon inflation and in that both the raising hose and the barrier hose are arranged to obtain a reduced volume when air is evacuated therefrom to permit the boom to sink.

According to a preferred embodiment the barrier hose is inflated with the compressed air in the lifting hose, this being effected by placing the two hoses in communication with one another when the boom reaches the surface. Any further air required can be supplied through, for example, a compressor.

Other characterizing features of the invention will be evident from the following claims.

One embodiment of the invention will now be described in more detail with reference to the accompanying drawing.

DESCRIPTION OF A PREFERRED EMBODIMENT OF THE INVENTION

Figure 1:
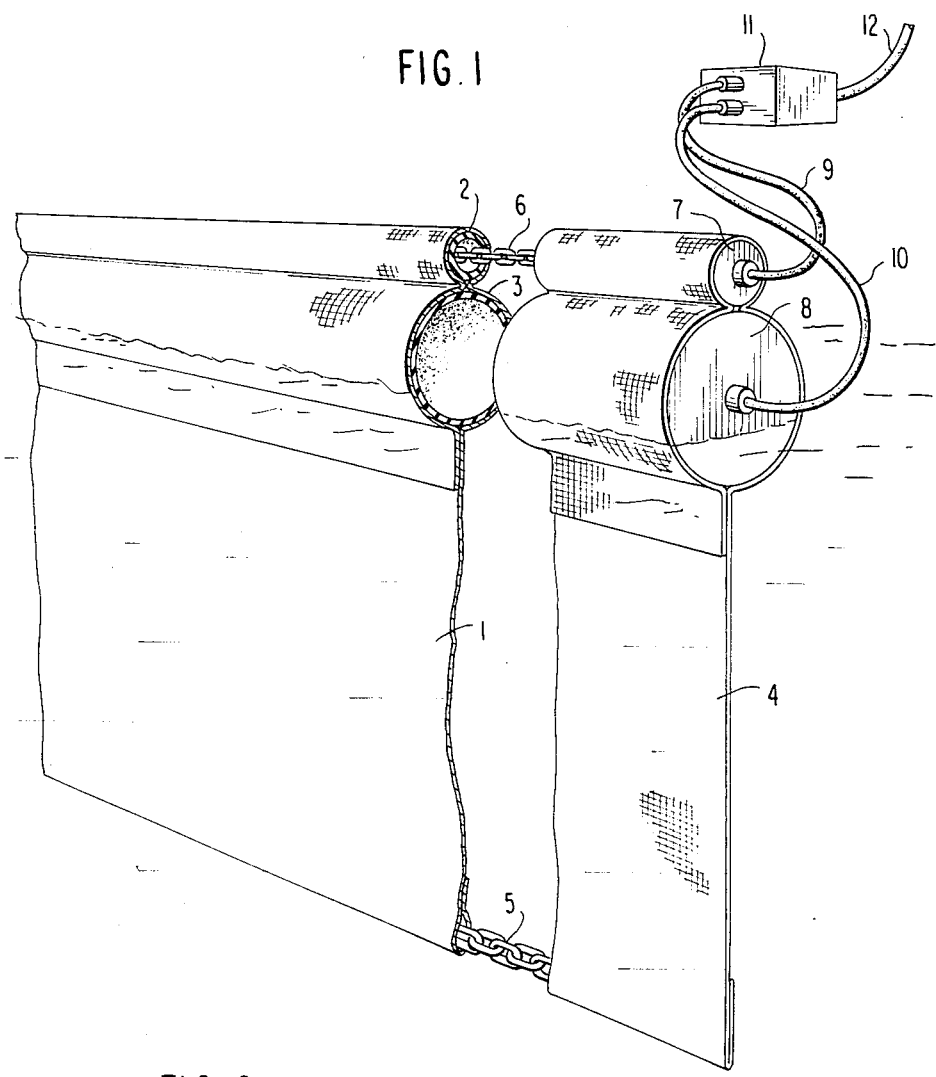
FIG. 1 is cut-away view of a boom according to the invention in its active state.

As will be seen from FIG. 1, a boom according to the invention includes two hoses 2 and 3 which are enclosed in a casing 1 and which are shown to be inflated with compressed air. In an evacuated state, the hoses are substantially flat. The hose 2, which is constructed to withstand high pressures has a relatively small diameter and forms the boom-raising hose, while the hose 3 forms the actual barrier member of the boom. The hose 2 may, for example, be a rubberised polyester hose of the kind normally used as a fire hose, since a diameter of 60–80 mm is sufficient to provide the requisite lifting force. Such hoses can be readily made to withstand pressures of up to 65 kp/cm$^2$, meaning that the hoses can be used at depths reaching to 650 m. The barrier hose 3 may be of a simpler kind, and may for example be made from butyl rubber. For sheltered places a diameter in the region of 200 mm is sufficient, while when the boom is to be used at sea, the barrier hose should have a diameter of at least 500 mm. The pressure in the barrier hose should not be higher than that required to hold the hose fully round, since the flexibility and the conformability of the hose decreases with increasing pressure. A pressure of from 50 to 100 p/cm$^2$ should be sufficient.

The casing 1 fills several purposes, and may, for example, comprise an oil-resistant woven plastics material, reinforced with polyester and coated with PVC. The casing is sewn or welded, to provide two elongate tubular pockets, for accommodating a respective hose 2 and 3, which are thereby always held correctly positioned relative to one another and protected against external influences. The casing 1 also extends beneath the hose 2, to form a blocking skirt 4, said skirt suitably extending to a depth of 50–100 cm. Along the lower edge of the skirt 4 is formed a pocket for receiving a relatively strong chain 5, which serves as a sinker. A chain 6 of smaller dimensions is also arranged in the boom-raising hose 2. This chain serves as a sinker, when parking the boom on the sea bed, and as a means of taking-up tensile forces in the hose 2 when subjecting the same to pressure, or when the boom is used to pen in the oil, i.e. to enclose the oil, by joining the ends of the boom together.

The hoses 2 and 3 are provided at their respective ends with end pieces 7 and 8, respectively, in which air lines 9 and 10 are mounted. Although not shown in the illustrated embodiment of FIG. 1, anchoring lines should also be attached to the end pieces 7 of the lifting hose 2, the chain 6 also being secured to the end pieces 8. In the illustrated embodiment, the lines 9 and 10 are coupled to a valve means 11, which in turn communicates with a source of compressed air, such as a compressor or like device, via a compressed-air line 12. The valve means 11 is arranged to connect one line or the other, or both lines 9 and 10 to the compressor line 12, and also to couple the line 9 and 10 together, to equalize the pressures in the hoses 2 and 3. The valve means 11 is also arranged to permit air to be evacuated from the hoses 2 and 3, via the lines 9 and 10, respectively. Compressed-air bottles may be used, for example, in addition to a compressor or a combination of compressed-air bottles and a compressor may be used. In this respect, the lifting hose 2 of small volume can be inflated first with the aid of compressed-air bottles under high pressure, whereafter, when the tube has reached the surface of the water, a compressor can be used to top up the hose 3 at a much lower pressure.

A boom of the aforedescribed kind can be manufactured quite economically, for example with the aid of movable sewing machines, since the casing 1 can be prepared with the application of solely three longitudinally extending seams, suitably double, sail-seams.

The manner in which a boom according to the invention is used will now be described with reference to FIG. 2, which illustrates the use of the boom as a latent protective device for an inlet or like waterway, said protective device being actuable when required. In this respect, the boom is laid out on the sea bed, the hoses 2 and 3 being evacuated of air and substantially flat. The chains 5 and 6 serve, in this respect, as weights which hold the boom lying against the sea bed, so that the boom will not be moved by underwater currents. The boom is anchored to the shore, or to buoys or like anchoring means, with the aid of anchoring lines attached to the end pieces of the hose 2. The passive state of the boom is illustrated at 13 in FIG. 2.

When an alarm is received to the effect that an oil slick has formed, the pressure line 9 is connected to a suitable source of air under pressure, to inflate the lifting hose 2. Since this hose is of the high-pressure type, it can be inflated at very great depths, without the hose exploding when it reaches the surface of the water. As before-mentioned, the lifting hose may have a relatively small volume, since the force required to lift the boom in the water is quite moderate. The reference 14 shows the boom on its way to the surface of the water, only the lifting hose 2 being placed under pressure. At this stage, the thin-walled barrier hose is still flat.

Figure 2:
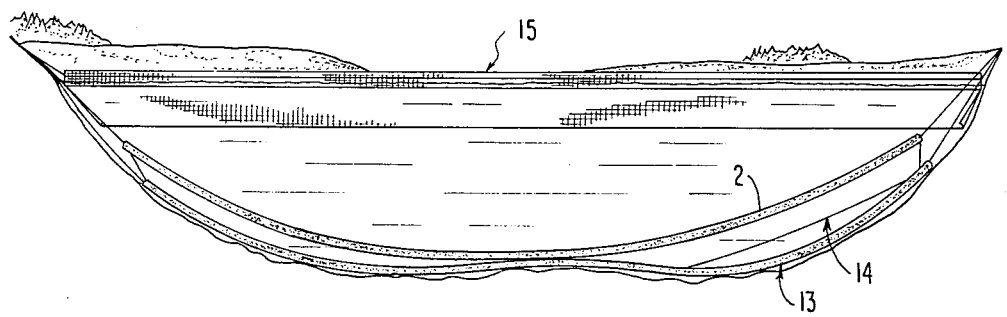
FIG. 2 illustrates the manner in which a boom according to FIG. 1 is used.

When the lifting hose 2 has moved the boom to the surface, see position 15 in FIG. 2, the valve means 11 connects the compressed-air line 9 with the line 10, whereupon the overpressure in the hose 2 is passed to the line 10 for inflating the barrier hose 3. A certain amount of additional air is normally required to fully inflate the barrier hose 3, so that it is substantially completely circular in cross-section. This additional air may be supplied, for example, from a compressor via the compressed-air line 12.

When the barrier hose 3 has been fully inflated, the boom will provide good protection, since the barrier hose 3 and the lifting hose 2 prevent impurities on the surface from passing the boom, while the depending skirt 1, held stretched by the weight 5 prevents particles from passing immediately below the surface of the water. Due to its lightweight, the boom will readily accompany movement of the sea, and as a result of the circular-cylindrical configuration of the barrier hose 3, the wind will have very little affect on the effective height of the boom.

When the danger is over, the hoses 2 and 3 can again be evacuated. The hoses will then collapse, and become substantially flat, whereupon the boom will again sink to the sea bed, as a result of the weight of chains 5 and 6. The chain 6 in boom raising hose 2 inherently prevents folding of the hose 2 as the hose sinks to the seabed, and inherently assures air passage throughout the hose even if evacuated from one end to insure complete collapse of the hose 2. The hoses 2 and 3 can be pressurized and evacuated through one or both ends. When evacuating the hoses at both ends thereof, the chain 5 should have its greatest weight at the centre of the boom, to effectively force the air from the hoses 2 and 3, while if evacuation is only effected at one end of respective hoses, the chain should have its greatest weight at opposite ends of boom.

As will be understood from the foregoing, a boom constructed in accordance with invention can be used in many contexts, where it is desired to provide latent protection against, for example, possible oil slicks, where the boom in a passive state will not present an obstacle to normal water traffic, and where the boom can be used substantially irrespective of water depth, as a result of the double-hose construction. The boom is extremely simple and robust, and can be dimensioned to suit the majority of conditions which may occur. Because of the chain 6 in the lifting hose 2 the boom can also be used to enclose oil by penning, to facilitate oil being penned and collected on the site of the spill, or to permit the oil to be moved to a protected location, where it is later taken care of. In addition to oil, a boom constructed in accordance with the invention may, of course, also be used in respect of other impurities floating on or immediately beneath the surface of the water. Thus, booms according to the invention may suitably be placed outside industrial outlets, for example for collecting fibrous effluents from pulp industries.

The invention is not restricted to the aforedescribed embodiments, but can be modified in several respects. For example, the hoses can be held together in any suitable manner, either with or without the skirt. Furthermore, in shallow water the skirt may extend from the barrier hose right to the sea bed. If considered suitable, the boom may also be complemented with any type of shield. In order to accelerate movement of the boom to the surface, the barrier hose may be arranged to be filled with air as soon as the water pressure has fallen beneath a given level. This can be effected through a pressure-sensing valve. When the boom is intended for extreme depths of water, the boom may also be provided with several lifting hoses, thereby to reduce the dimensions of each individual hose. The boom may also be provided with a plurality of barrier hoses, connected together in some suitable manner. In addition to being anchored and supplied with air from land-based locations the boom may also be anchored to and supplied with air from buoys, boats, oil-rigs and the like.

I claim:

1. In a floating boom for confining or preventing the spread of floating impurities, especially oil, which boom is arranged to be brought from a passive state, in which it may rest on the sea bed, to an active blocking state by being caused to float to the surface, said boom comprising:

an inflatable boom-raising hose for causing said boom to float to the surface, characterized in that said boom-raising hose is constituted by a high-pressure hose of a size such that the hose upon inflation gives a raising force sufficient to raise the boom from the sea bed and to keep it floating, and wherein said boom-raising hose carries internally a chain 6 which acts as a weight to drive the hose and boom to the sea bed, which takes up tensile forces, which prevents folds being formed as the boom-raising hose sinks to the sea bed and which insures air passage therethrough, full evacuation of air therefrom, and complete collapse of the boom-raising hose during evacuation of air the...om at one or both ends thereof when the hose is deflated.

2. A boom according to claim 1, further comprising a second, gas-tight barrier hose, said barrier hose comprising a flexible low pressure hose, means for inflating said barrier hose as the boom reaches near surface and having a diameter considerably greater than the diameter of the raising hose, in order to give the desired blocking effect upon inflation, and means for placing said barrier hose in communication with said raising hose to equalize the pressure in the hoses when the boom reaches said surface.

3. A boom according to claim 2, characterized in that the raising hose (2) and the barrier hose (3) are each enclosed in a respective pocket in a casing (1), said casing including a portion which hangs down beneath the hoses and which serve as a blocking skirt (4).

4. A boom according to claim 3, characterized in that a weight (5) is arranged along the lower edge of the skirt (4).

5. A boom according to claim 4, characterized in that said weight (5) includes a chain (5) enclosed in a pocket in said casing (1).

6. A boom according to any one of claims 1–5 characterized in that the raising hose (2) comprises the kind of hose used as fire hoses.

* * * * *